March 31, 1936.  A. B. BELL  2,035,452

AISLE SEAT

Filed Dec. 21, 1934  3 Sheets-Sheet 1

INVENTOR
Alfred B. Bell
BY Henry Van Arsdale
his ATTORNEY

March 31, 1936. A. B. BELL 2,035,452
AISLE SEAT
Filed Dec. 21, 1934 3 Sheets-Sheet 2
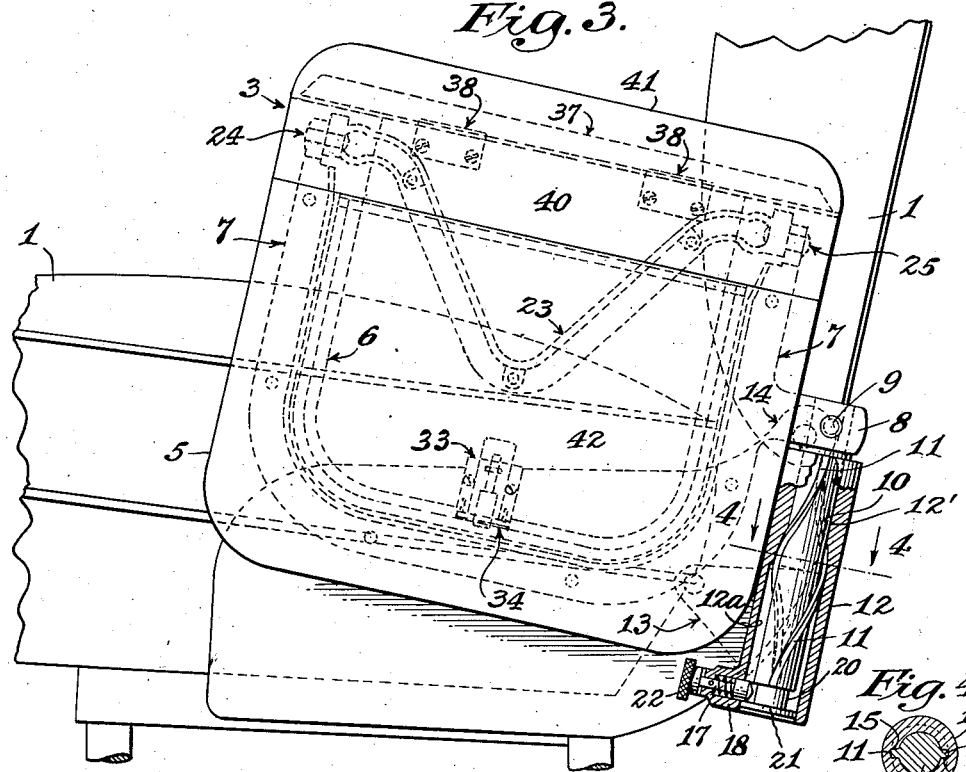
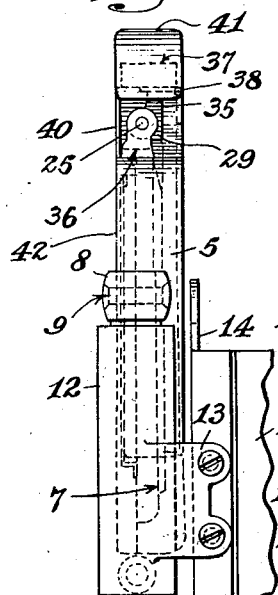
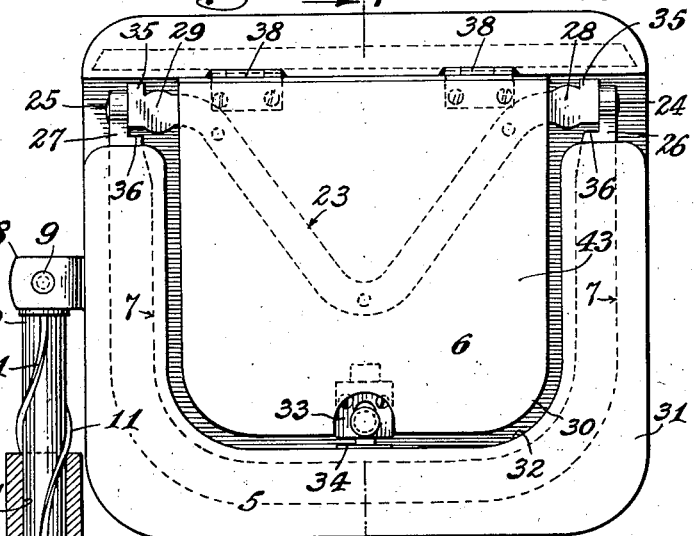
INVENTOR
Alfred B. Bell
BY Henry Van Arsdale
his ATTORNEY March 31, 1936.  A. B. BELL  2,035,452
AISLE SEAT
Filed Dec. 21, 1934   3 Sheets-Sheet 3

INVENTOR
Alfred B Bell
BY
his ATTORNEY

Patented Mar. 31, 1936

2,035,452

UNITED STATES PATENT OFFICE 2,035,452

AISLE SEAT

Alfred B. Bell, Gardner, Mass., assignor to Heywood-Wakefield Company, Boston, Mass., a corporation of Massachusetts Application December 21, 1934, Serial No. 758,571

8 Claims. (Cl. 155—33)

This invention relates to convertible aisle seats for motor busses, tram cars and other vehicles, and more particularly relates to aisle seats comprising a seating member and a back member which normally serve as arm rests for two main seats positioned at opposite sides of an aisle and are swingable into cooperating relation in the aisle to form a seat therein between the main seats.

The principal object of this invention is to provide an aisle seat of this convertible type and character, and an aisle seat which is sturdy, durable, neat and attractive in appearance, and steady and free of rattle and noise not only when the seating and back members are in arm rest relation to the main seats but also when forming the aisle seat; and to provide an aisle seat in which these members may be moved easily and conveniently into and out of either arm rest positions or aisle seat forming positions.

Another object of this invention is to provide an aisle seat of this character and one which not only provides an extremely comfortable aisle seat but also provides extremely comfortable arm rests for the occupants of the main seats adjacent the aisle, and having copious and comfortable upholstery; and a further object of this invention is to provide an aisle seat back of the character described and one which is extensible so that when positioned in the aisle, its height may be increased to give added back support and comfort to an occupant of the aisle seat, and when serving as an arm rest for the main seat, the height may be reduced to a most comfortable arm rest height for an occupant of the main seat; and a further object of the invention is to provide a back member of this type and which, when in arm rest position, presents deep and comfortable upholstery across its top for the elbow or arm of the occupant of the main seat.

Another object of this invention is to provide an aisle seat of the character described and one in which the seating and back members thereof, when in arm rest positions, are latched against being displaced inadvertently or at inopportune times.

Other objects of this invention will be in part obvious and in part pointed out hereinafter.

In order that a clearer understanding of this invention may be had, attention is hereby directed to the accompanying drawings forming a part of this application and illustrating certain possible embodiments of this invention and in which:

Fig. 3 is an elevation, partly in section, of the aisle seat back member in arm rest position on the main seat, as viewed from the aisle;

Fig. 4 is a sectional view of a detail thereof, and is taken on the line 4—4 of Figure 3;

Fig. 5 is an end view thereof as viewed from the rear;

Fig. 6 is a front elevation of the aisle seat back member swung into the aisle and in folded or collapsed condition, and shows in section a portion of the bracket supporting this member;

Similar reference characters refer to similar parts throughout the several views of the drawings.

Figure 1:
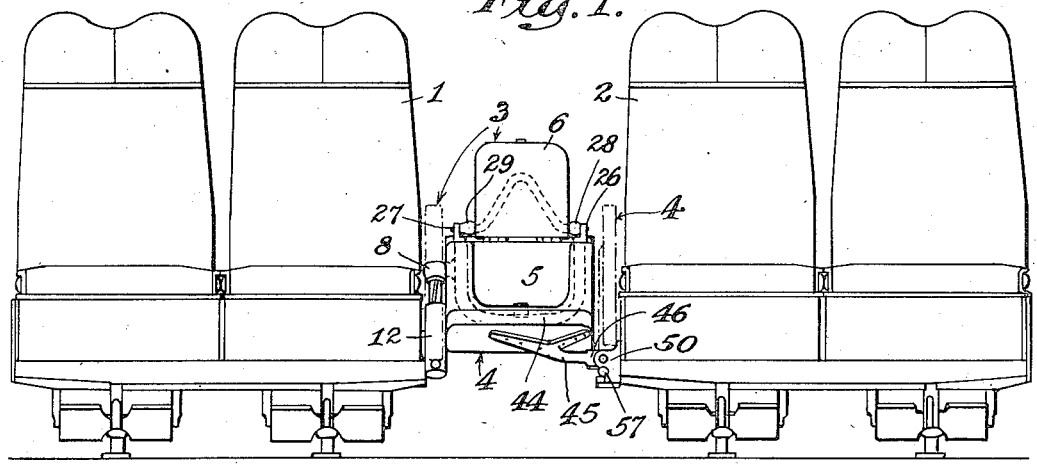
Fig. 1 is a front elevation of two main or permanent seats on opposite sides of an aisle, and showing, in full lines, an aisle seat embodying this invention formed in the aisle, and showing, in dash lines, the arm rest positions of the seating and back members of the aisle seat.
Figure 2:
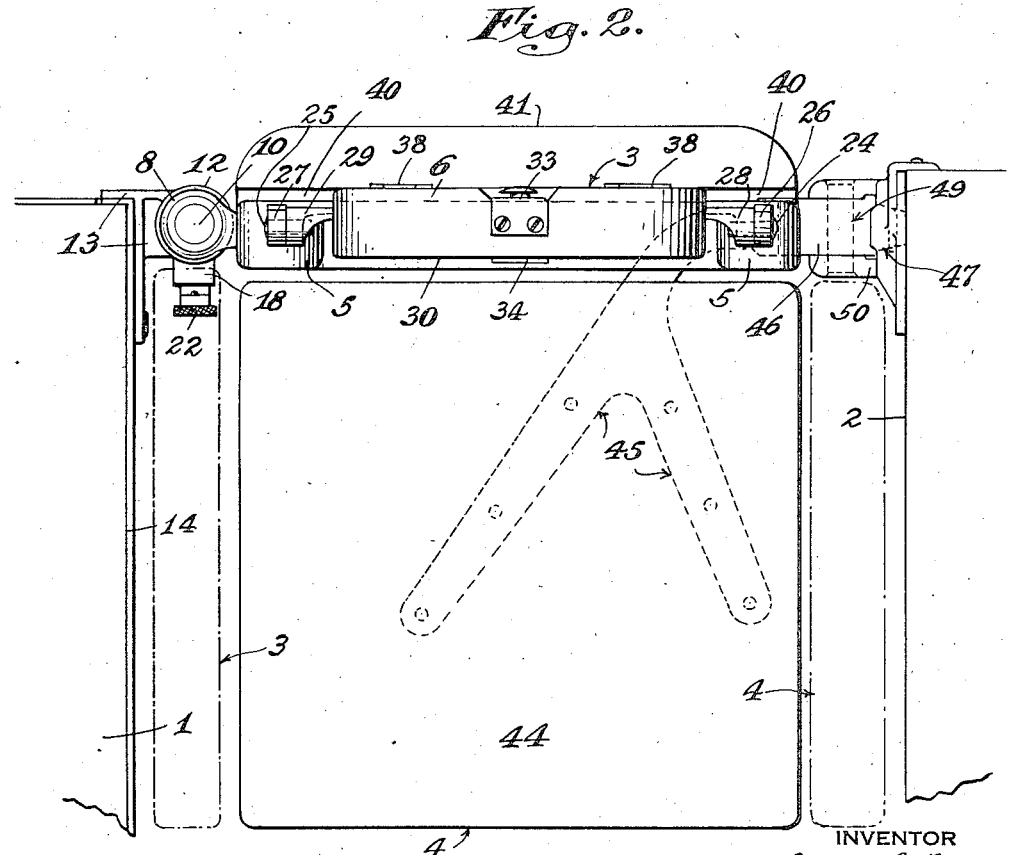
Fig. 2 is a plan view, enlarged, of the aisle seat and adjacent parts shown in Fig. 1.

Referring to the drawings, there is shown therein two main chairs or seats 1 and 2 having an aisle between them. An arm rest and aisle seat back member 3 is mounted on the aisle end of seat 1 to swing on a vertical axis selectively against the seat 1, in which position it serves as an arm rest for this seat, as shown by dash lines in Fig. 1, and into the aisle, in which position it serves as the back of the aisle seat. An arm rest and aisle seating member 4 is mounted on the aisle end of the opposite seat 2 to swing selectively on a horizontal axis into upright position against the end of seat 2, and in this position serves as an arm rest for the seat, as shown by dash lines in Fig. 1, and into horizontal position in the aisle to be in seating position in front of the member 3 when in aisle seat back position.

Figure 7:
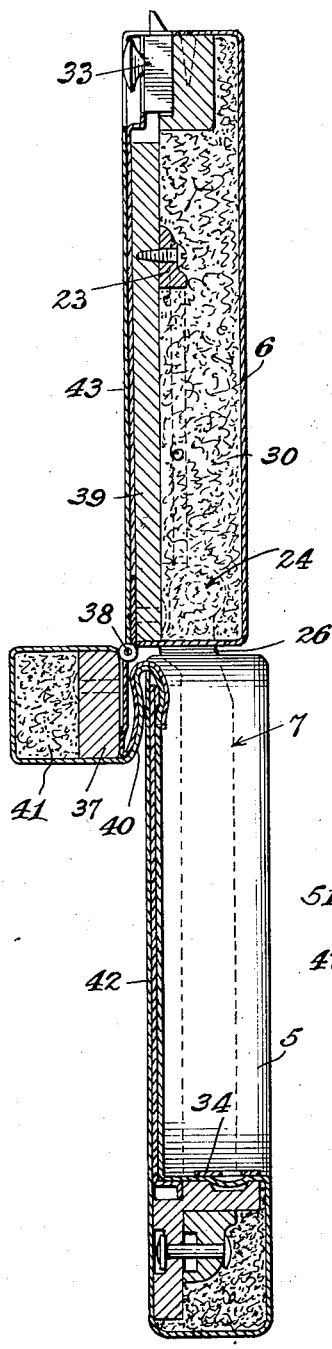
Fig. 7 is a sectional view of the aisle seat back member in extended condition, and is taken on line indicated at 7—7 of Fig. 6.
Figure 8:
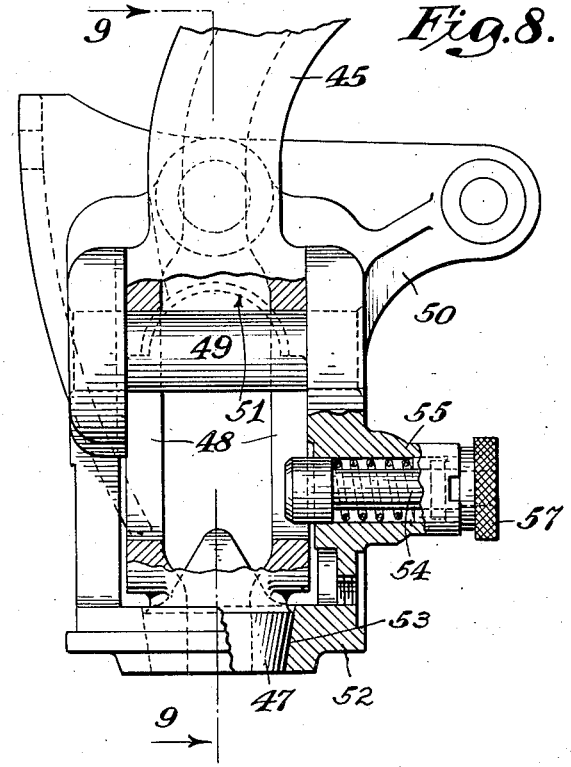
Fig. 8 is a front elevation, partly in section, of the mounting of the aisle seating member, this member being shown in arm rest position.
Figure 9:
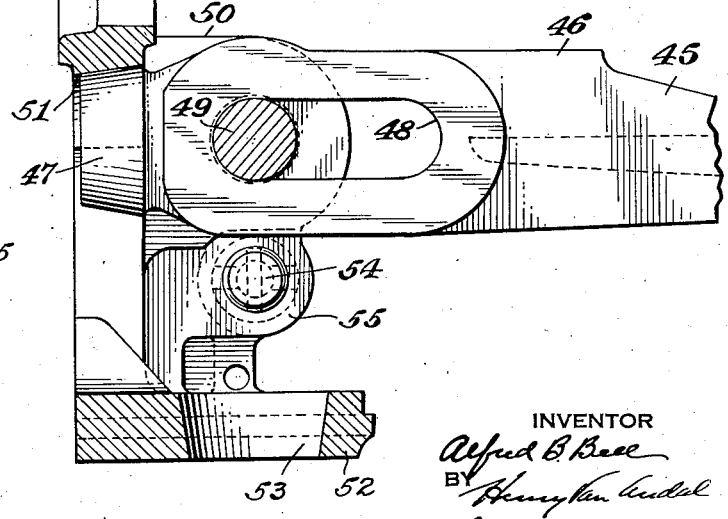
Fig. 9 is a sectional view thereof and is taken on the line 9—9 of Fig. 8, the aisle seating member being in lowered or seating position.

The aisle seat back member 3 comprises a lower section 5 and an upper section 6 which may be folded into the lower section, as shown in Fig. 6, and may be swung upwardly into vertical alignment therewith, as shown in Fig. 7. The lower section 5 has a U-shaped frame 7 having an extending collar 8 in which is secured, as by pin 9, the upper end of a shaft or post 10 which is provided longitudinally with two diametrically opposite projecting helical ribs 11. Post 10 seats rotatably in an elongated vertical socket 12 of a bracket 13 which is rigidly secured to the end of the main seat 1, preferably to the frame 14 thereof. The upper portion of socket 12 has a bore 12′ of the same diameter as the diameter of the post 10 and has diametrically opposite helical grooves 15 therein in which the ribs 11 of the post 10 slidably engage, so that when the post is rotated in the socket the post is raised or lowered depending on the direction of the rotation. The lower portion of the socket 12 has a larger bore 12a accommodating the ribs 11. The junction of these bores forms an annular shoulder 16 in the socket.

The ribs 11 on post 10 and the complementary grooves 15 therefor in the bore 13 of the socket are so arranged that when the frame 7 is rotated from arm rest position into aisle seat back position it is automatically raised a substantial distance, and as the back member is returned to arm rest position it is automatically lowered.

To prevent displacement of this back member from arm rest position inadvertently or at inopportune times a spring latch 17 is mounted in a bearing portion 18 formed at the lower end of socket 12, and is self-engaging in a reduced portion 20 adjacent the lower end of post 10, the post terminating in a head 21. Latch 17 has a finger piece 22 whereby the latch may be disengaged manually from the post 10 so that the post and the back member carried thereon may be rotated from arm rest position into aisle seat back position. The head 21 of the post is so related to the shoulder 16 in the socket 12 that when the back member has been swung into position squarely across the aisle, that is, into aisle seat back position, the head 21 engages the shoulder 16 and stops further rearward rotation of the back member.

The upper section 6 of the back member has a bow-shaped bracket member 23 which is pivoted at each end to the upper ends of the U-shaped frame 7, as by means of headed pins or studs 24 and 25 which penetrate and pivotally connect lugs 26 and 27 on the frame 7 to lugs 28 and 29 on the ends of bracket 23.

A suitable cushion 30 is secured to the bracket 23 of the upper back section 6, and the face of the lower back section 5 has comfortable cushioning 31 secured to frame 7, this cushioning 31 being shaped in a U and forming a hollow or recess 32 in which the upper back section fits, when the upper section is collapsed into the lower section. Preferably a suitable cabinet latch 33 is mounted within the cushion 30 and is adapted to engage a keeper 34 secured on the frame of the U-shaped cushioning 31 when the cushion 30 is in the recess. When the latch is retracted the cushion 30 with its bracket 23 may be swung upwardly into vertical alignment over the lower back portion 5, and is prevented from movement beyond the vertical by stops 35 at each end of the bracket 23 engaging stop shoulders 36 adjacent the lugs 26 and 27 of the frame 7. The U-shaped cushioning comfortably fits against and supports the occupant at the small of the back, and the occupant's back may also curve into the recess sufficiently to come against the backing strip 42, which extends across the recess 32, and is part of the face of this lower back section.

To provide a soft and comfortable cushion across the top of this seat back unit when in arm rest position, a frame strip 37 is hinged at one edge, as at 38, to the frame 39 of the cushion 30. The other edge of frame strip 37 is tethered to the lower back section 5 by finishing fabric 40, so that when the upper section 6 of the back is collapsed into the lower section 5, the frame strip 37 will be drawn by the tether 40 across the top of the section 5. As the upper section 6 is moved into upward position it carries the frame strip 37 rearwardly and disposes it behind the sections 5 and 6, thus permitting the adjacent edges of the back parts 5 and 6 to be close together when the back is in extended position. Frame strip 37 carries comfortable and copious upholstery 41. Both the lower section 5 and the upper section 6 may be provided on their uncushioned faces with suitable finishing material, as at 42 and 43.

The seating section of the aisle seat comprises a suitable cushion 44 mounted on a bracket 45 which has a projecting portion 46 terminating in a tapered lug end 47 and having an elongated slot 48 adjacent thereto. Bracket 45 is hinged on a pin 49 which extends through slot 48 and is carried on a bracket 50 which is secured to the aisle end of seat 2. Bracket 50 has a vertical portion provided with a recess forming a downwardly open socket 51, in which the lug end 47 of the arm 45 engages when the seating member 4 and its bracket arm 45 are in horizontal position in the aisle, that is in aisle seating position. Bracket 50 has also a horizontal portion 52 provided with a vertical socket 53 adapted to receive the lug end 47 of the bracket arm 45 when the seating member 4 and arm 45 are in vertical position against the end of seat 2, that is, in arm rest position. If desired, a spring latch 54 may be housed in a bearing portion 55 formed on bracket 50, and adapted to engage in the recess 48 of the arm 45 just above the end of the slot when the member 4 is in arm rest position, so that the member 4 and its bracket arm 45 cannot be raised to disengage its end 47 from the socket 53 or lowered to aisle seating position unless latch 54 is first retracted, which may be done manually by means of the finger knob 57 on the latch.

Normally, the aisle seat back member 3 is collapsed and in arm rest position against the end of seat 1, and the aisle seating member is in arm rest position against the end of seat 2. When it is desired to form the auxiliary seat in the aisle the latch 17 is retracted and member 3 swung into the aisle. During this rotation member 3 is elevated. Latch 54 is then retracted and the seating member 4 raised to disengage its lug end 47 from the socket 53 and then swung into seating position in the aisle. The section 6 of the back member may be unlatched and elevated either prior or subsequent to the placement of member 4 in the aisle. Thus an aisle seat is established which is exceedingly comfortable, having copious upholstery and a back elevated and extended to a most comfortable height.

To restore the parts to arm rest positions the upper section of the back member is folded into the lower section and the back member swung back to arm rest position against the seat 1. Member 4 is swung upwardly into arm rest position against the seat 2, whereupon this member automatically reengages its lug end 47 in the socket 53. Latches 17 and 54 automatically lock the aisle seat members in arm rest position and against inadvertent displacement therefrom.

It will be apparent from the above that the aisle seat back member, when serving as the back of the aisle seat is not only elevated to a comfortable position but also is extended in height so as to give more extensive support to the back of an occupant and making the seat more comfortable to use; the copious and deep upholstery also contributing to comfort and attractiveness in appearance. This member, when moved to arm rest position, is lowered and reduced in height to an elevation and a height most comfortable to an occupant of the seat which it serves, and presents a deep and soft cushion to the occupant's elbow and arm, and thus provides a most comfortable and attractive arm rest. The mounting of the back member, whereby this member is automatically raised and lowered as it is swung from one position to the other, is positive, durable and noiseless in action, and is exceptionally free of rattles and noises when the member is in either position. It is further apparent that many other advantages and improvements are embraced in a construction embodying this invention.

As many changes could be made in the above construction and as many apparently widely different embodiments of the invention could be made without departing from the scope thereof, it is to be understood that all matter contained in the above description or shown in the accompanying drawings be interpreted as illustrative and not in a limiting sense.

What I claim is:

1. In aisle seating of the character described, in combination, a seat, a folding arm rest and seat back member pivoted on the seat and swingable thereon into arm rest position and into aisle seating position selectively, said folding member including a lower vertical section and an upper section hinged at one edge to the top of the lower section and swingable downwardly against the lower section and upwardly in vertical alignment therewith selectively, a topping piece hinged at one side to said hinged edge of said upper section whereby said topping piece is brought over said sections when the upper section is swung downwardly against the lower section and is moved into position behind said sections when said upper section is swung upwardly.

2. In aisle seating of the character described, in combination, a seat, a folding arm rest and seat back member pivoted on the seat and swingable thereon into arm rest position and into aisle seating position selectively, said folding member including a lower vertical section and an upper section hinged at one edge to the top of the lower section and swingable downwardly against the lower section and upwardly in vertical alignment therewith selectively, a topping piece hinged at one side to said hinged edge of said upper section to swing over said sections when the upper section is disposed against the lower section and to swing into position behind said sections when sections are in vertical alignment, and means including a tether connecting said topping piece and said lower section, whereby the topping piece is swung to and held in position over said sections when the upper section is folded upon the lower section.

3. In aisle seating of the character described, a seat and a folding arm rest and aisle seat back member pivoted on the seat to swing thereon selectively into arm rest position and into aisle seating position, said folding member including a lower vertical section having a frame provided with cushioning of a shape forming a central recess, and an upper section hinged along one edge to the top of the lower section and swingable downwardly into the central recess of said cushioning and upwardly into vertical alignment with said lower section selectively, and a topping piece hinged at one side to said hinged edge of said upper section whereby said topping piece is brought over said sections when the upper section is folded against the lower section and is moved into position behind said sections when said upper section is swung upwardly.

4. In aisle seating of the character described, in combination, a seat, a bracket at one end of the seat and having a socket with a vertical bore, the upper portion of said bore having a smaller diameter than the lower portion of the bore and having helical grooves, and presenting a downwardly directed abutment at the juncture of said bore portions, an arm rest and aisle seat back member having a post journaled in said socket, said post having helical ribs engaging said helical socket grooves and freely rotatable in said lower bore position, and having an abutment at the lower end of the post adapted to engage the abutment in the socket limiting the extent of upward movement of the post, whereby said arm rest and aisle seat back member is raised when swung outwardly of the seat into aisle seat back position and is lowered when swung toward the seat into arm rest position at the end of the seat, and outward movement of the member is limited to aisle seat back position.

5. In aisle seating of the character described, in combination, a seat, an arm rest and aisle seat back member having a lower section including an upright U-shaped frame and an upper section hinged on said frame to swing selectively downwardly against the face of the lower section and upwardly into vertical alignment thereover, and means mounting said lower section on the seat to swing selectively outwardly of the seat into aisle seat back position and inwardly into arm rest position at the end of the seat.

6. In aisle seating of the character described, in combination, a seat, an arm rest and aisle seat back member having a lower section including an upright U-shaped frame and an upper section hinged on said frame to swing selectively downwardly against the face of the lower section and upwardly into vertical alignment thereover, and means mounting said lower section on the seat to swing selectively outwardly of the seat into aisle seat back position and inwardly into arm rest position at the end of the seat, said means including a vertical socket at an end of said seat and a post secured to said frame and seated in said socket to rotate on a vertical axis.

7. In aisle seating of the character described, in combination, a seat, an arm rest and aisle seat back member having a lower section including an upright U-shaped frame and an upper section hinged on said frame to swing selectively downwardly against the face of the lower section and upwardly into vertical alignment thereover, and means mounting said lower section on the seat to swing selectively outwardly of the seat into aisle seat back position and inwardly into arm rest position at the end of the seat, said means including a vertical socket at an end of said seat and a post secured to said frame and seated in said socket to rotate on a vertical axis, said socket having internal helical grooves and said post having complementary helical ribs engaging in said grooves, whereby said arm rest and aisle seat back member is elevated when swung to aisle seat back position and is lowered when swung to arm rest position.

8. In aisle seating of the character described, in combination, a seat, an arm rest and aisle seat back member having a lower section including an upright U-shaped frame and an upper section hinged on said frame to swing selectively downwardly against the face of the lower section and upwardly into vertical alignment thereover, and means mounting said lower section on the seat to swing selectively outwardly of the seat into aisle seat back position and inwardly into arm rest position at the end of the seat, said means including a vertical socket at an end of said seat and a post secured to said frame and seated in said socket to rotate on a vertical axis, said socket having internal helical grooves and said post having complementary helical ribs engaging in said grooves, whereby said arm rest and aisle seat back member is elevated when swung to aisle seat back position and is lowered when swung to arm rest position, means on said socket and post limiting outward movement of said arm rest and aisle seat back member to aisle seat back position, and means on said lower section frame and said upper section limiting upward movement of said upper section to vertical alignment over the lower section.

ALFRED B. BELL.